US007035086B2

(12) United States Patent
Williams et al.

(10) Patent No.: US 7,035,086 B2
(45) Date of Patent: Apr. 25, 2006

(54) REMOVABLE STORAGE OF SPEAKERS WITHIN CAVITIES OF ELECTRONIC DEVICE HOUSING

(75) Inventors: David Williams, Corvallis, OR (US); Glen Oross, Corvallis, OR (US); Memphis-Zhihong Yin, Tomball, TX (US); Michael D. Derocher, Woodlands, TX (US); Robert Bliven, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 10/393,960

(22) Filed: Mar. 22, 2003

(65) Prior Publication Data

US 2004/0184201 A1   Sep. 23, 2004

(51) Int. Cl.
*G06F 1/16* (2006.01)

(52) U.S. Cl. .................. 361/679; 381/88; 345/905; 292/302

(58) Field of Classification Search ........ 361/679–687, 361/726–727; 292/137, 302; 381/87, 88, 381/309, 385; 312/223.1, 203.9; 345/169, 345/905
See application file for complete search history.

(56) References Cited

U.S. PATENT DOCUMENTS

| 4,764,962 | A | | 8/1988 | Ekman et al. ............... 381/301 |
|---|---|---|---|---|
| 5,046,104 | A | * | 9/1991 | Kloss .......................... 381/335 |
| 5,166,851 | A | * | 11/1992 | Jacobson ..................... 360/137 |
| 5,235,822 | A | | 8/1993 | Leonovich, Jr. ........... 62/457.2 |
| 5,768,399 | A | * | 6/1998 | Statham et al. ............. 381/120 |
| 5,852,545 | A | | 12/1998 | Pan-Ratzlaff ............... 361/683 |
| 5,946,343 | A | * | 8/1999 | Schotz et al. ............... 375/141 |
| 6,087,497 | A | * | 7/2000 | Izawa et al. ................ 544/276 |
| 6,148,243 | A | * | 11/2000 | Ishii et al. .................... 700/94 |
| 6,151,206 | A | * | 11/2000 | Kato et al. .................. 361/681 |
| 6,176,346 | B1 | | 1/2001 | Wiener ....................... 181/199 |
| 6,181,550 | B1 | * | 1/2001 | Kim ............................ 361/683 |
| 6,243,260 | B1 | * | 6/2001 | Lundgren et al. ........... 361/683 |
| 6,269,259 | B1 | | 7/2001 | Lai .......................... 455/569.1 |
| 2005/0105754 | A1 | * | 5/2005 | Amid-Hozour ............. 381/346 |

OTHER PUBLICATIONS

Internet web page, Crutchfield—Sony CFD-ZW755, www.crutchfield.com, date unknown.
Internet web page, Cambridge SoundWorks—Model Twelve Transportable Music System, www.hifi.com, date unknown.

* cited by examiner

*Primary Examiner*—Hung Van Duong

(57) ABSTRACT

An electronic device of an embodiment of the invention is disclosed that includes a housing and an electronic mechanism. The housing has one or more cavities for removably storing speakers, which are intended for non-use when stored in the cavities. The electronic mechanism is fixably situated within the housing.

35 Claims, 9 Drawing Sheets

REMOVABLE STORAGE OF SPEAKERS WITHIN CAVITIES OF ELECTRONIC DEVICE HOUSING

BACKGROUND OF THE INVENTION

Integrating audio with computer-displayed slide shows and video presentations has become popular, adding an extra dimension to such presentations to maintain the interest of audiences. The slide shows and video presentations themselves are commonly displayed using digital projectors. Digital projectors have become portable and transportable in size, making them well suited for bringing along with laptop computers for giving remote presentations.

However, playing audio with such slide shows and video presentations can be problematic. A presenter usually cannot rely on the internal speakers of his or her laptop computer, as those speakers are typically not powerful enough to hear clearly within a large room. Bringing more suitable speakers can be unwieldy, requiring the presenter to encumber him or herself with even more electronic equipment, in addition to a laptop computer and a digital projector.

SUMMARY OF THE INVENTION

An electronic device of an embodiment of the invention includes a housing and an electronic mechanism. The housing has one or more cavities for removably storing speakers, which are intended for non-use when stored in the cavities. The electronic mechanism is fixably situated within the housing.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Projector

Figure 1:
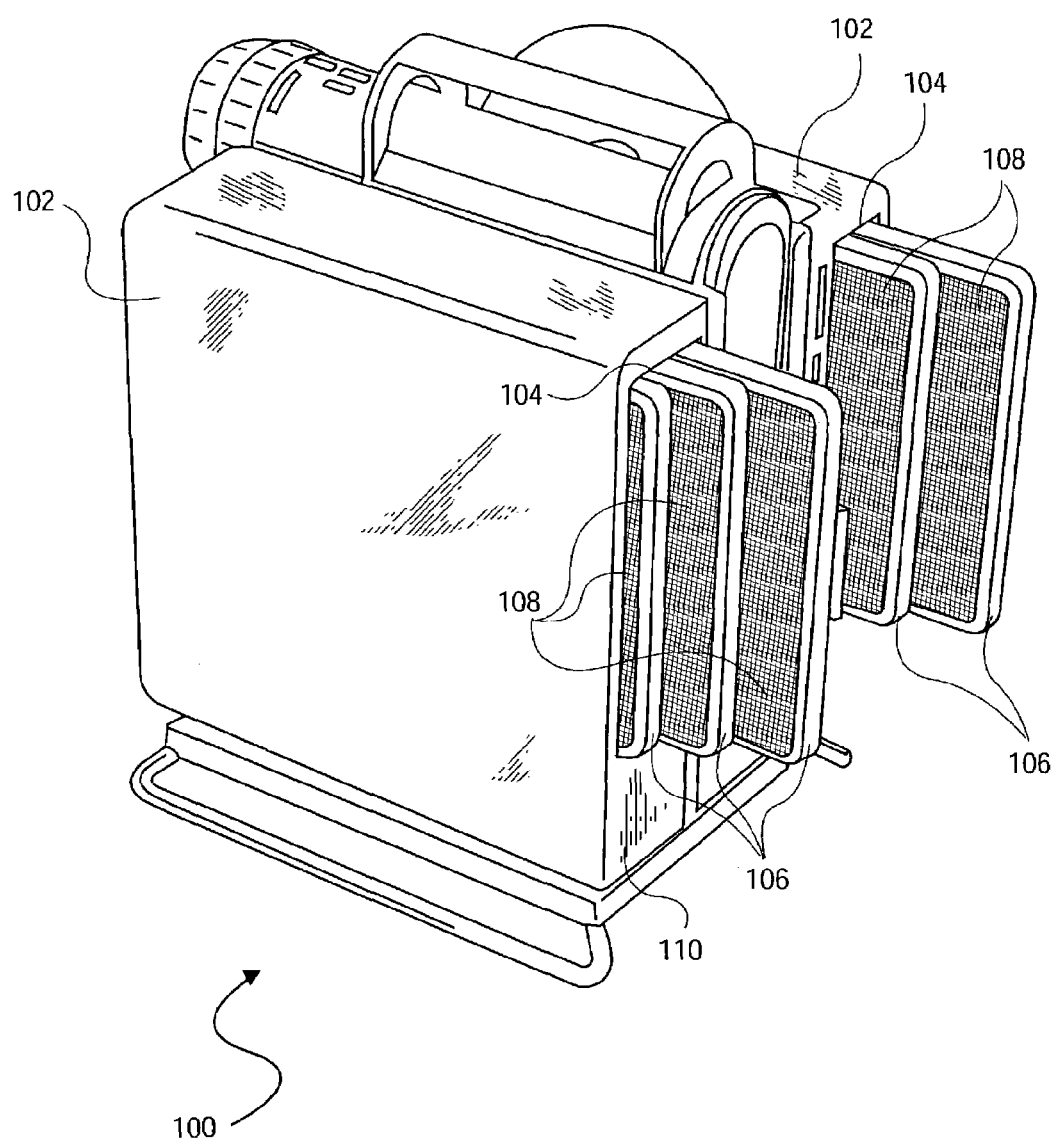
FIGS. 1 and 2 are diagrams of perspective views of a projector having cavities within a housing in which speakers can be removably stored, according to an embodiment of the invention.
Figure 2:
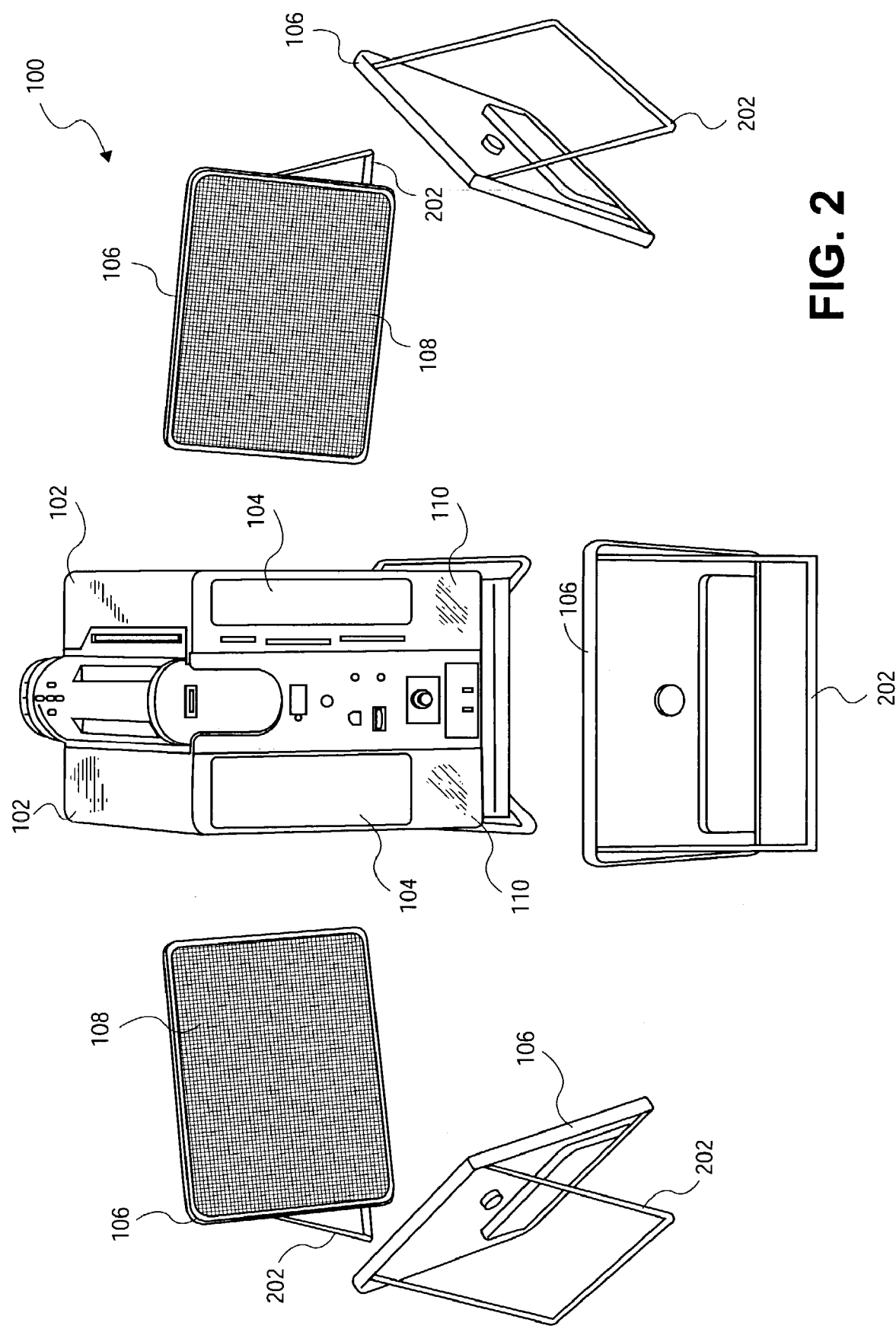

FIGS. 1 and 2 show a projector 100 having a housing 102 with cavities 104 in which speakers 106 are removably storable, according to an embodiment of the invention. FIG. 1 specifically shows the speakers 106 partially inserted into the cavities 104, whereas FIG. 2 specifically shows the speakers 106 completely removed from the cavities 104. The projector 100 allows for the projection of static or dynamic images as supplied by a computer or another electronic component. The projector 100 is more generally a display device, and even more generally an electronic device. The projection mechanism of the projector 100, not particularly called out in FIGS. 1 and 2, is fixably situated within the housing 102, and is more generally an electronic mechanism. That the projection mechanism is fixably situated within the housing 102 means that it is not removable and/or not normally intended for removal from the housing 102.

The speakers 106 having front surfaces 108 that preferably are not exposed when the speakers 106 are completely inserted into the cavities 104. In other words, the speakers 106 are only partially exposed when completely inserted into the cavities 104 in the embodiment of FIGS. 1 and 2. Thus, when the speakers 106 are inserted into the cavities 104, they are not intended for use, but rather are intended to be protected and/or transported when stored in the cavities 104. The speakers 106 are intended for use conversely when removed from the cavities 104, as is specifically depicted in FIG. 2. The speakers 106 may be wired or wireless speakers, as can be appreciated by those of ordinary skill within the art.

Where there are five of the speakers 106 in the embodiment of FIGS. 1 and 2, there may alternatively be more or less than five of the speakers 106. For instance, the speakers 106 may be part of a surround-sound speaker system, such as a 5.1 surround-sound speaker system, where the speakers 106 are the left, right, center, left-surround, and right-surround speakers. There may also be six or seven of the speakers 106, for a 6.1 or a 7.1 surround-sound speaker system, where the additional one or two speakers are the additional one or two rear-surround speakers. Furthermore, in one embodiment, the speakers 106 can represent some of the channels of the speakers in a surround-sound speaker system, such as the center, left-surround, right-surround, and/or the one or two rear-surround speakers, where other speakers, potentially integrated within the housing 102, represent the left, right, and/or center speakers.

The speakers 106 in the embodiment of FIGS. 1 and 2 are substantially flat in shape. The speakers 106 also have foldable stands 202 hinged thereto, which is specifically depicted in FIG. 2. The foldable stands 202 may be folded into a closed position for insertion of the speakers 106 into the cavities 104, as is depicted in FIG. 1, or may be unfolded into an open position for standing the speakers 106 and usage thereof, as is depicted in FIG. 2. When the foldable stands 202 are folded, the speakers 106 may thus be stackably stored in the cavities 104. That is, the speakers 106 may be stacked one on top of another, and stored in the cavities 104. The speakers 106 may alternatively not be substantially flat in shape, and may alternatively not have the foldable stands 202 hinged thereto.

Furthermore, the cavities 104 of the housing 102 are externally exposed. This means that the cavities 104 are not completely internal to the housing 102, where the cavities 104 would only be exposed if the housing 102 were openable. Rather, the cavities 104 are externally exposed at external surfaces 110 of the housing 102. Whereas the housing 102 has two of the cavities 104 in the embodiment of FIGS. 1 and 2, in other embodiments the housing 102 may have or more or less than two of the cavities 104.

Figure 3:
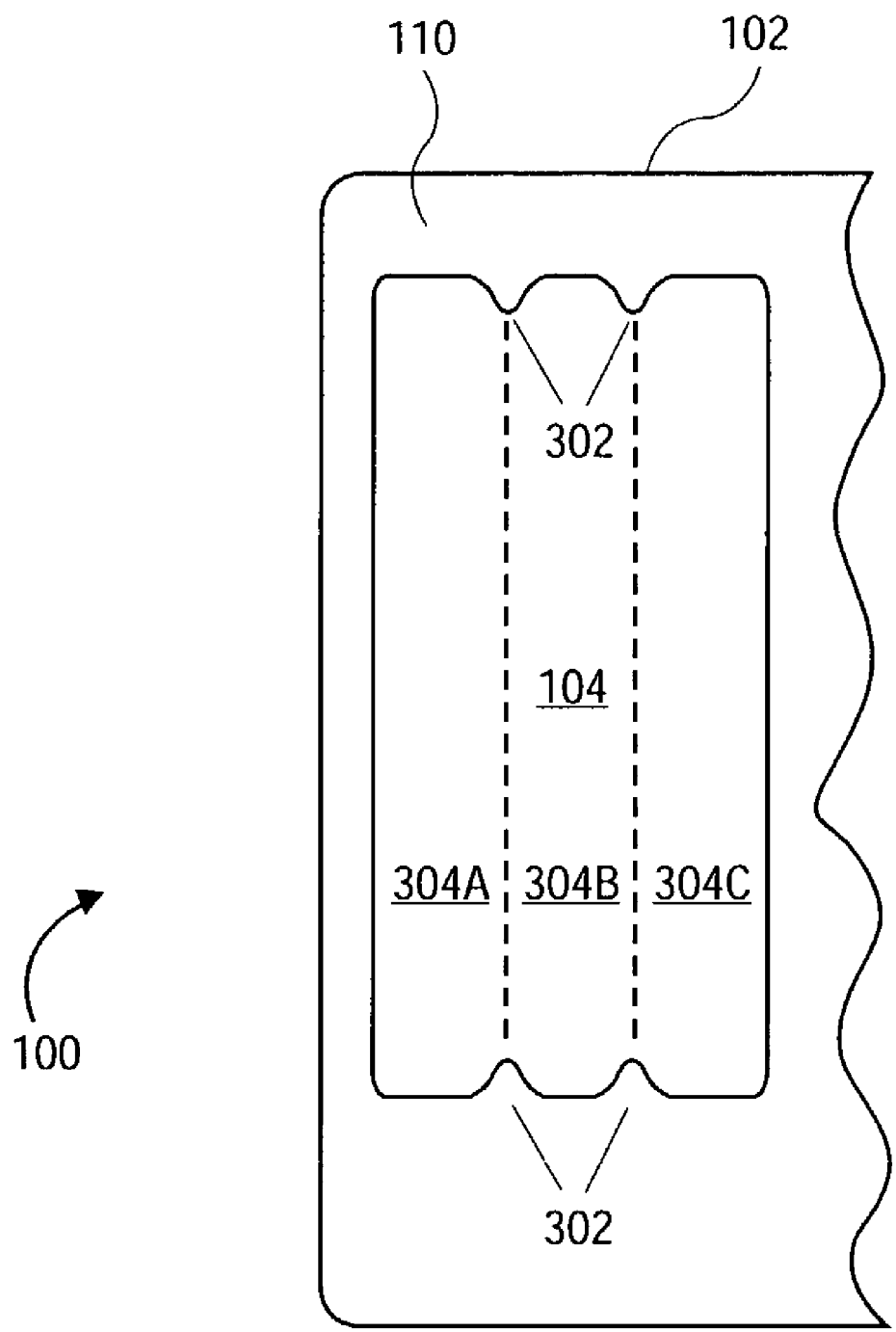
FIG. 3 is a diagram of a partial front view of the projector of FIGS. 1 and 2, according to an embodiment of the invention.

FIG. 3 shows a partial front view of the projector 100, according to an embodiment of the invention. The external surface 110 depicted in FIG. 3 contains one of the cavities 104. The housing 102 includes guiding grooves 302 around the cavities 104, defining discrete areas 304A, 304B, and 304C, collectively referred to as the discrete areas 304, of the cavities 104, for insertion of three of the speakers 106. That is, each of the areas 304 is receptive to one of the speakers 106. The guiding grooves 302 allow the speakers 106 to be individually guided into the areas 304. Thus, in the embodiment of FIG. 3, the speakers 106 may be individually slid into the cavities 104.

Covers and Low-Frequency Speakers

Figure 4:
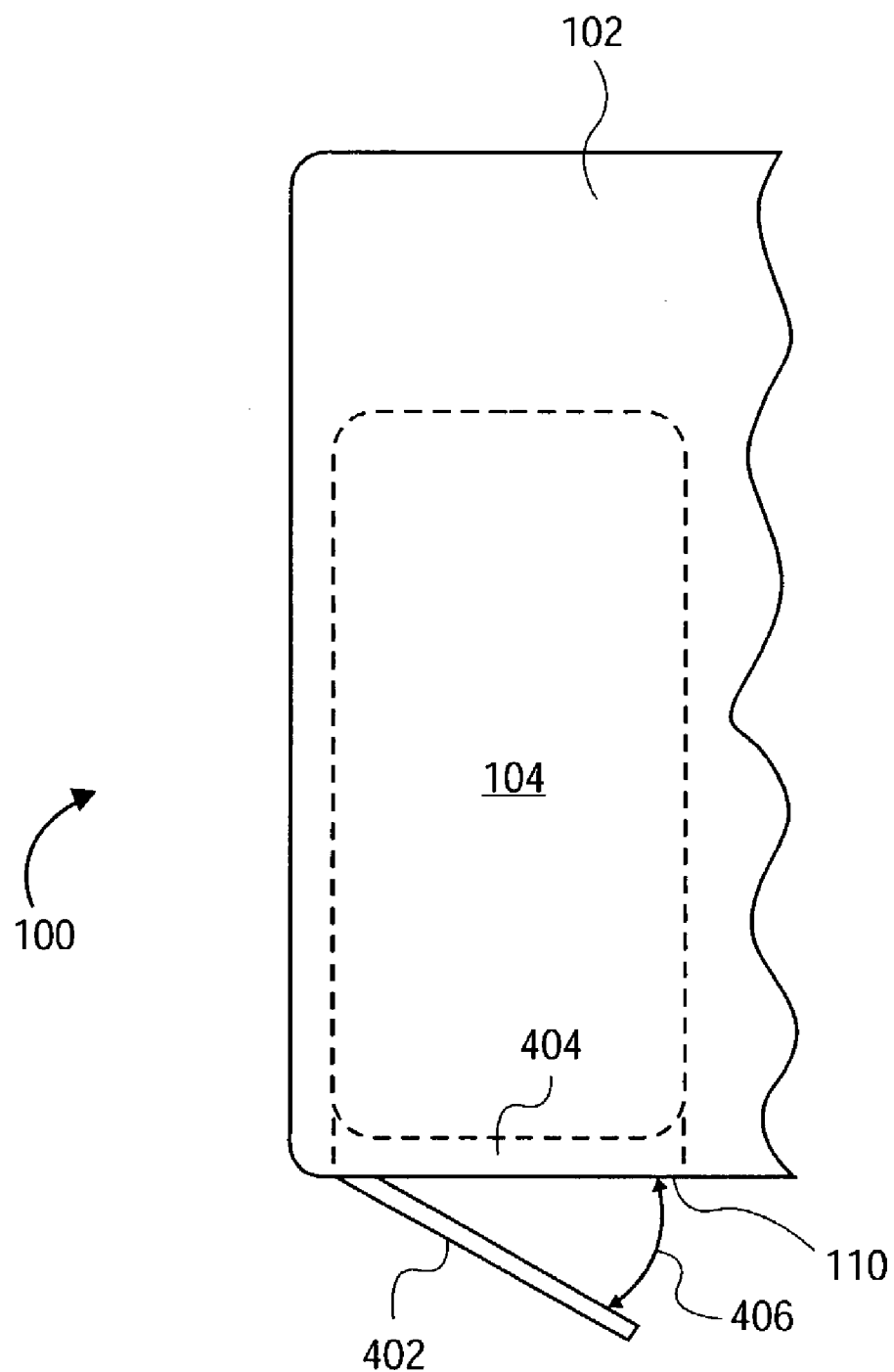
FIGS. 4 and 5 are diagrams of a partial top view and a perspective view, respectively, of the projector of FIGS. 1 and 2, in which the cavities have covers, according to an embodiment of the invention.
Figure 5:
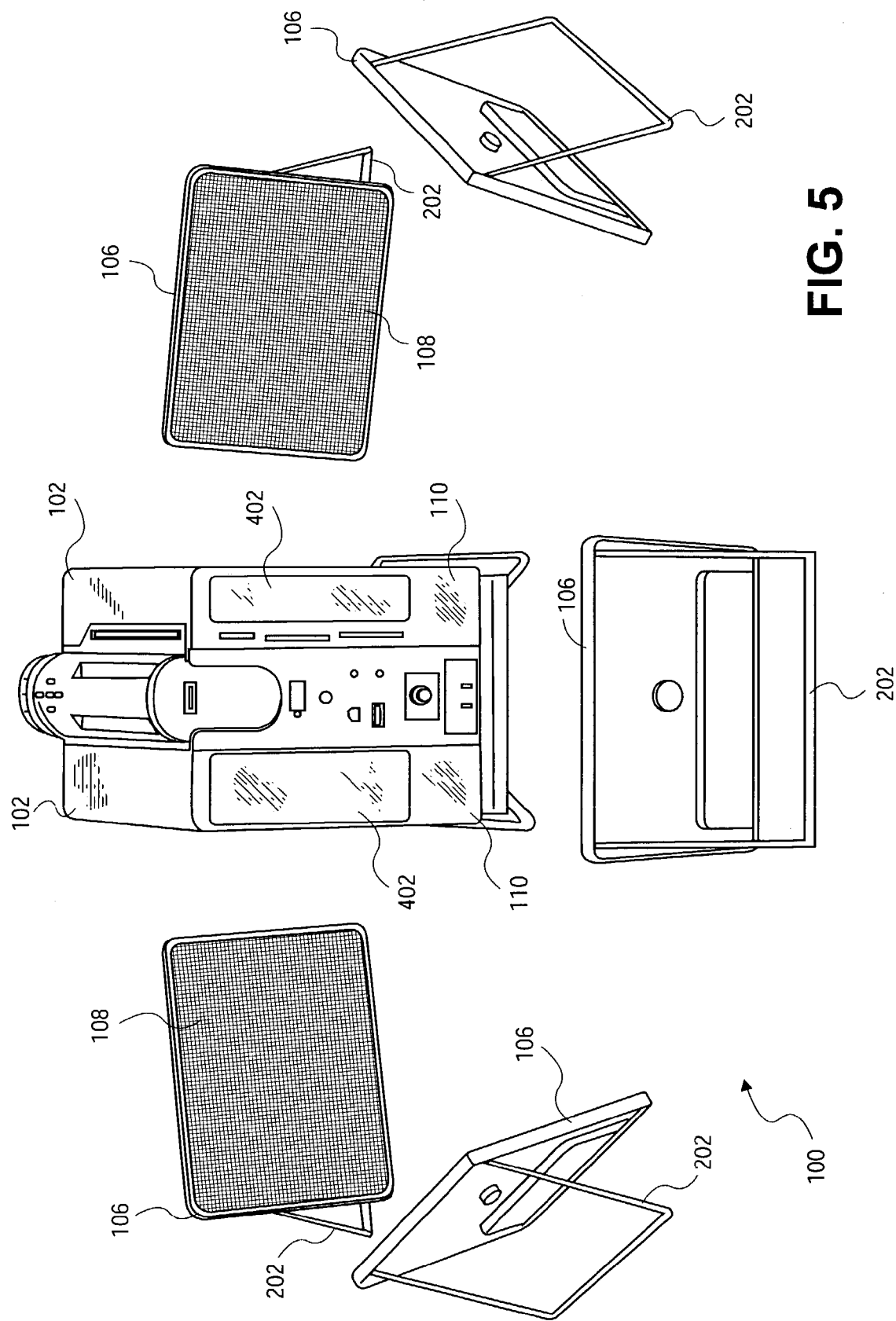

FIGS. 4 and 5 show a partial top view and a perspective view, respectively, of the projector 100, according to an embodiment of the invention. Like-numbered elements of FIGS. 4 and 5 and of FIGS. 1 and 2 are identical, and are not particularly redescribed in detail in relation to the embodiment of FIGS. 4 and 5. The projector 100 of FIGS. 4 and 5 includes covers 402 that correspond to the cavities 104, and close or cover the cavities 104, either with the speakers 106 within the cavities 104 and/or with the speakers 106 removed from the cavities 104. The covers 402 are depicted in FIG. 5 as being shaded for illustrative clarity. That is, in FIG. 5 the covers 402 are depicted as having covered the cavities 104.

As specifically depicted in FIG. 4, the covers 402 may be hinged or otherwise attached at one side to the housing 102 so that the covers rotate to and from a position 404 in which the covers 402 enclose the cavities 104, as indicated by the bi-directional arrow 406. Alternatively, the covers 402 may not be attached to the housing 102, and, for instance, snap into place in the position 404. The speakers 106 are thus unexposed after storage within the cavities 104 and after the covers 402 have closed the cavities 104. This provides an extra degree of protection for the speakers 106 when they are stored in the cavities 104 for transportation, for instance. When the covers 402 have closed the cavities 104, they are preferably flush with the external surfaces 110 of the housing 102.

Figure 6:
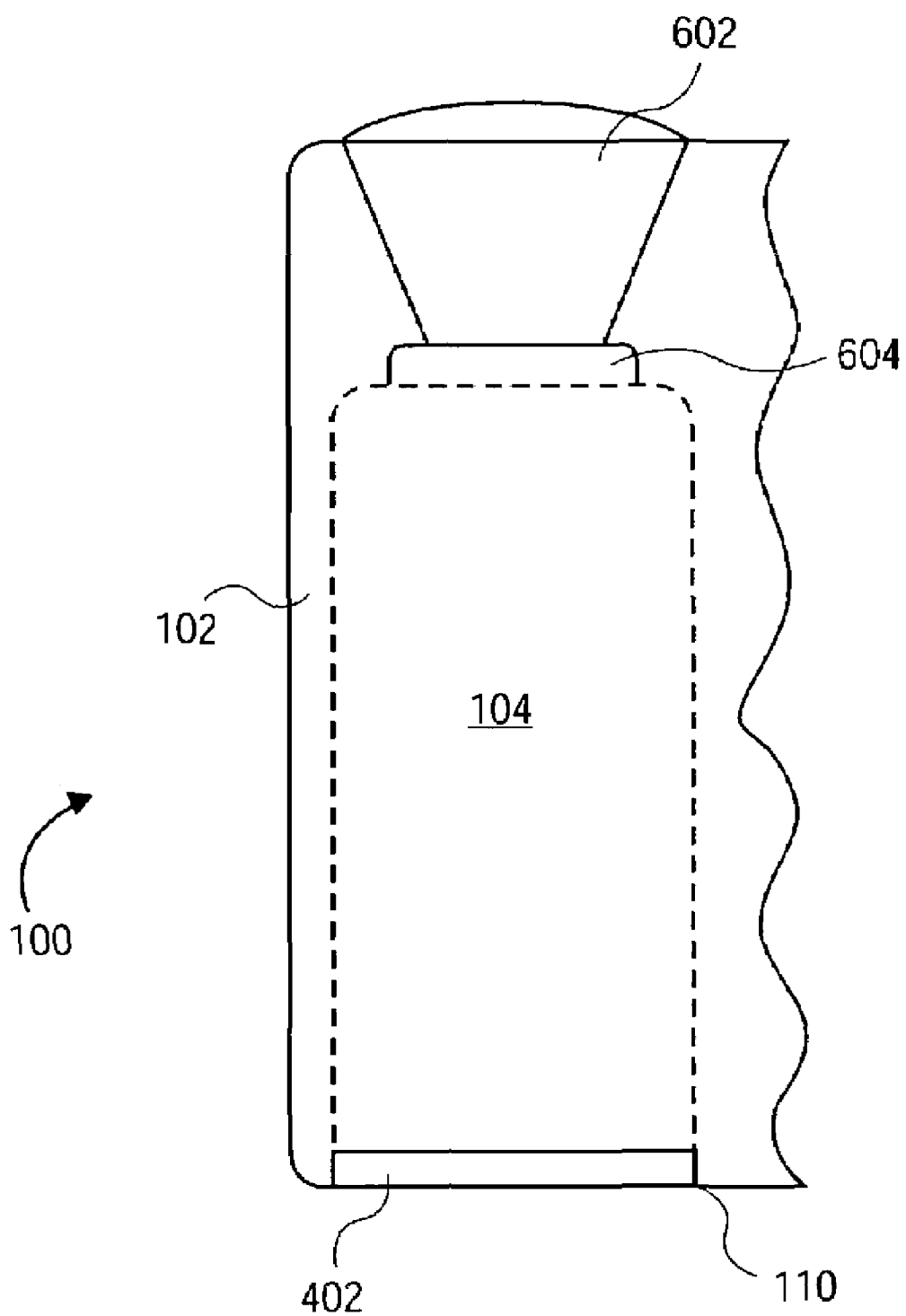
FIG. 6 is a diagram of a partial top view of the projector of FIGS. 4 and 5, in which the cavities serve as acoustical cavities for low-frequency speakers when covered, according to an embodiment of the invention.

FIG. 6 shows a partial top view of the projector 100 in which the covers 402 serve to acoustically seal the cavities 104, according to an embodiment of the invention. When acoustically sealed by the covers 402, the cavities 104 act or function as acoustical cavities. The projector 100 in the embodiment of FIG. 6 includes a low-frequency speaker 602 fixably mounted within the housing 102. The low-frequency speaker 602 is commonly referred to as a subwoofer. There can be more than one of the speaker 602. The speaker 602 may have its own acoustical cavity 604, which is extended by the cavities 104 when the cavities 104 are acoustically sealed. Alternatively, the cavities 104 may be the only acoustical cavities for the speaker 602 when the cavities 104 are acoustically sealed. Utilization of the cavities 104 as acoustical cavities for the low-frequency speaker 602 enables the speaker 602 to emit louder and more forceful low-frequency sounds.

General Electronic Device and Methods

Figure 7:
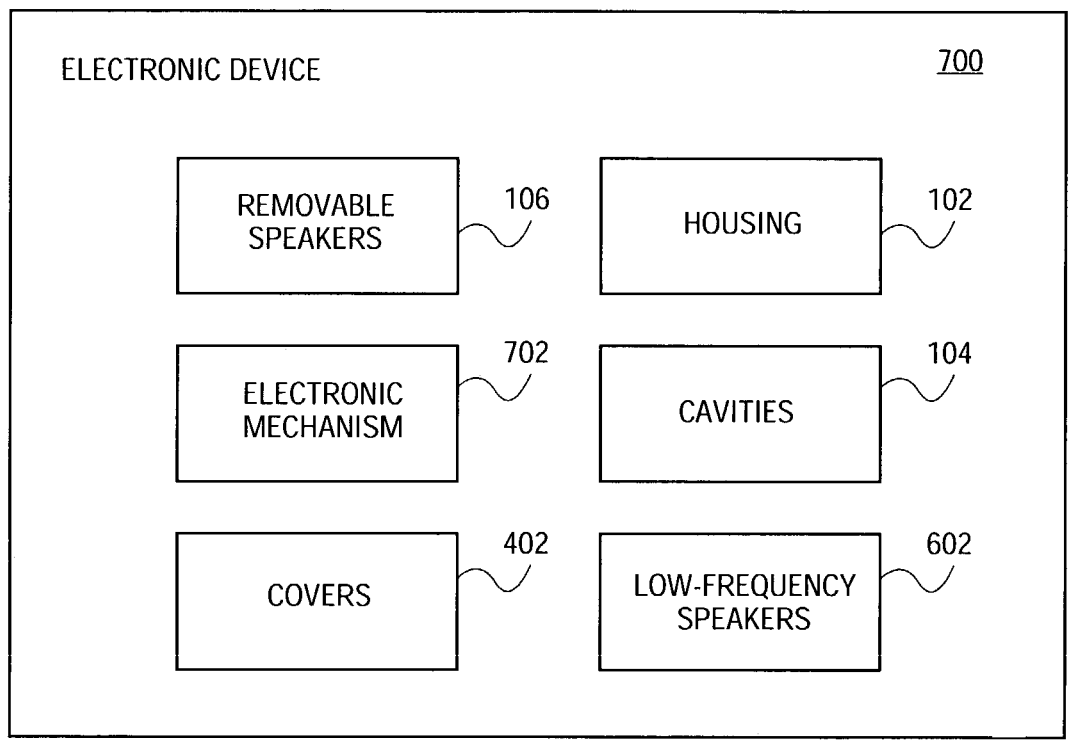
FIG. 7 is a block diagram of a general electronic device, according to an embodiment of the invention.

Embodiments of the invention have thus been far described in relation to an electronic device that is a projector. By comparison, FIG. 7 shows a block diagram of a more general electronic device 700, according to an embodiment of the invention. The electronic device 700 includes the removable speakers 106, the housing 102, an electronic mechanism 702, the cavities 104, and optionally the covers 402 and/or the low-frequency speaker(s) 602. The housing 102 includes the cavities 104, within which the speakers 106 are removably storable, as has been described. The covers 402 can cover the cavities 104, and may also acoustically seal the cavities 104 so that they function as acoustical cavities for the low-frequency speaker 602, as has also been described. The housing 102 can be referred to as an enclosure as well.

The electronic mechanism 702 is fixably situated within the housing 102. The electronic mechanism 702 preferably performs functionality that is the primary functionality of the electronic device 700. For instance, where the electronic device 700 is a projector, the electronic mechanism 702 may be a projection mechanism. As another example, the electronic device 700 may be an optical disc player, such as a compact disc (CD) player, digital versatile disc (DVD) player, or another type of optical disc player. In this example, the electronic mechanism 702 may include the optical disc playing mechanism, and any associated electronics. As can be appreciated by those of ordinary skill within the art, embodiments of the invention are not limited to the device 700 being a particular type of electronic device, nor the mechanism 702 being a particular type of electronic mechanism.

Figure 8:
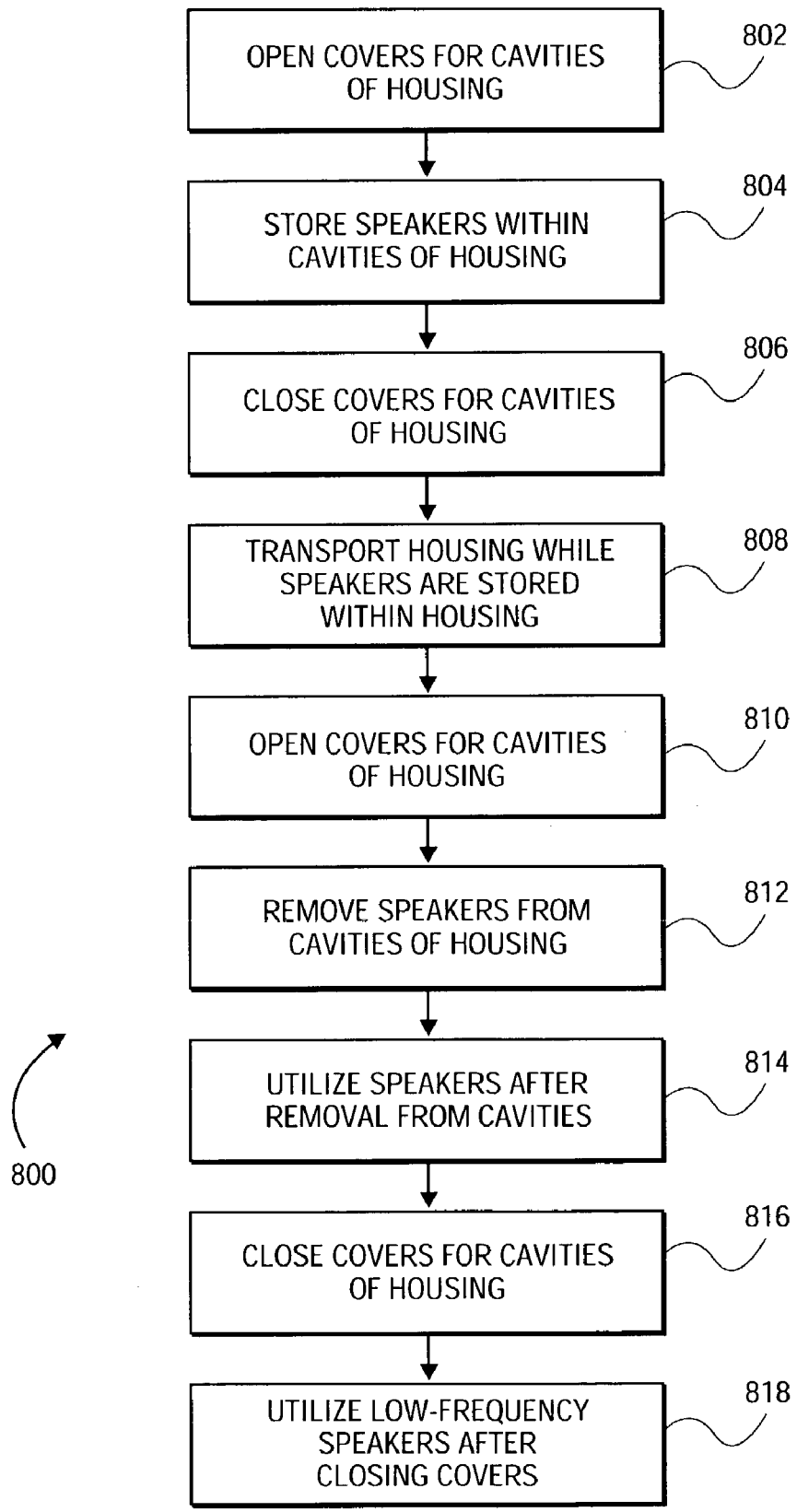
FIG. 8 is a flowchart of a method of use, according to an embodiment of the invention.

FIG. 8 shows a method of use 800, according to an embodiment of the invention. The method 800 is performed in conjunction with an electronic device, such as the electronic device 700, the projector 100, and so on. Not all parts of the method 800 are necessary for all embodiments of the invention. For instance, where the housing does not include covers for the cavities, and does not include low-frequency speakers, then 802, 806, 810, 816, and 818 may not be performed, since these parts of the method 800 particularly relate to the covers and/or the low-frequency speakers.

First, the covers for the cavities of the housing are opened (802), so that the speakers may be removably stored within the cavities (804). The speakers preferably cannot or should not be used for emitting sound while being stored within the cavities. The covers for the cavities are then closed (806), so that the housing may be transported while the speakers are stored within the cavities of the housing (808). The speakers are thus protected within the cavities of the housing during transportation. Once the electronic device has been transported to a desired destination, the covers for the cavities are opened (810), and the speakers removed (812) so that the speakers may be utilized (814) for playing sound. If the electronic device includes low-frequency speakers, the covers may be closed (816) to acoustically seal the cavities to function as acoustical cavities for these speakers, so that the low-frequency speakers may be utilized (818) for playing sound.

Figure 9:
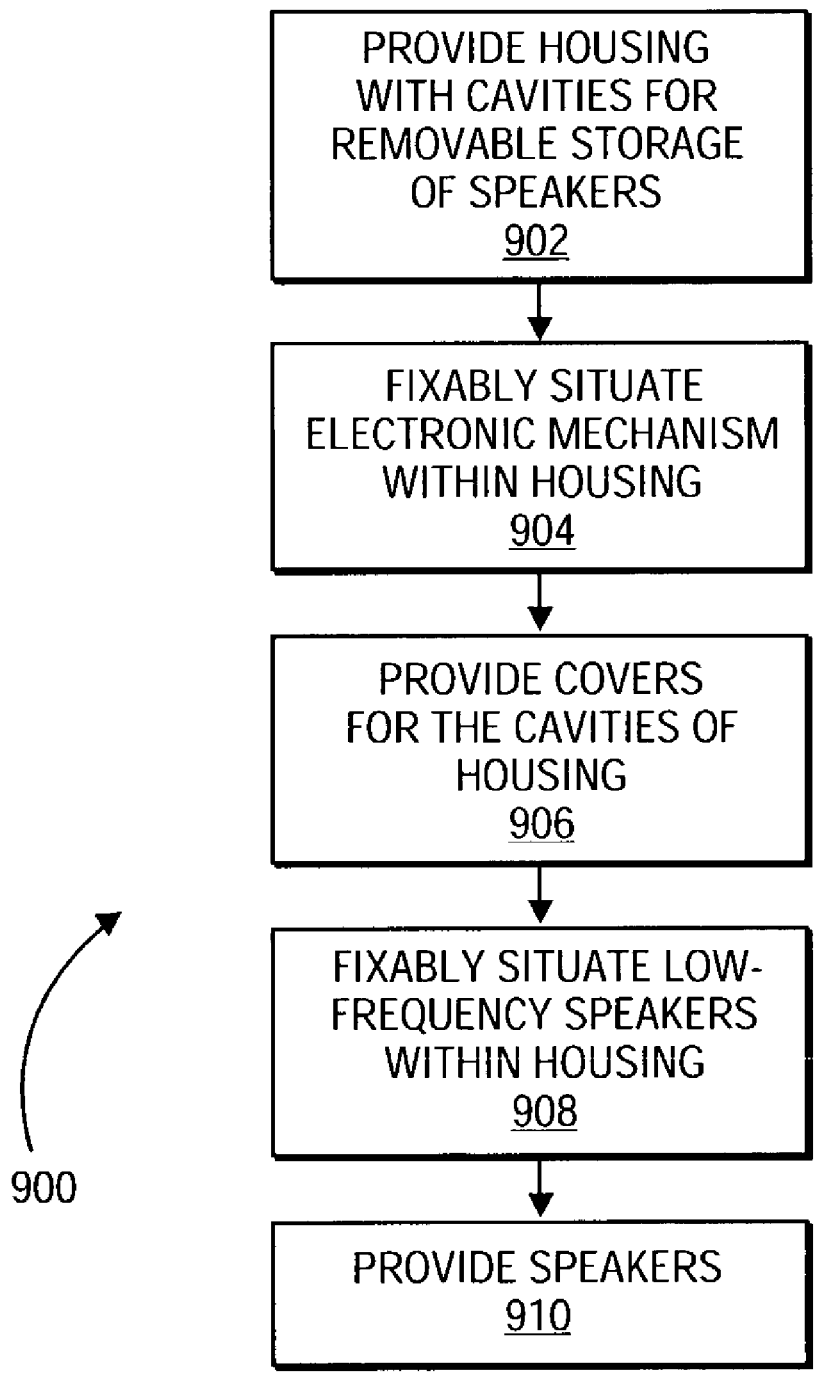
FIG. 9 is a flowchart of a method of manufacture, according to an embodiment of the invention.

FIG. 9 shows a method of manufacture 900, according to an embodiment of the invention. The method 900 is performed to manufacture an electronic device, such as the electronic device 700, the projector 100, and so on. Not all pats of the method 900 are necessary for all embodiments of the invention. For instance, where the housing is not to include covers for the cavities, nor low-frequency speakers, then 906 and 908 may not be performed. As another example, the removable speakers may or may not be a part of the electronic device, such that 910 may or may not be performed.

First, a housing is provided with cavities for the removable storage of speakers (902), as has been described. An electronic mechanism is fixably situated within the housing (904). The electronic mechanism may be a display mechanism, such as a projection mechanism. Covers for the cavities of the housing are optionally provided (906). Low-frequency speakers are also optionally situated within the housing (908). In such an embodiment, preferably the covers acoustically seal the cavities so that the cavities function as acoustical cavities for the low-frequency speakers. Finally, the removable speakers are optionally provided as well (910).

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. An electronic device comprising:
a housing having one or more cavities for removably storing a plurality of speakers, the plurality of speakers intended for non-use when stored in the cavities, and completely removable and non-electrically disconnectable from the housing;
an electronic mechanism fixably situated within the housing;
one or more covers corresponding to the one or more cavities of the housing, such that the speakers are unexposed alter storage of the speakers in the cavities and the covers have closed the cavities.

2. The electronic device of claim 1, further comprising:
one or more low-frequency speakers fixably mounted within the housing,
wherein the one or more covers corresponding to the one or more cavities of the housing acoustically seal the cavities to function as acoustical cavities for the low-frequency speakers.

3. The electronic device of claim 1, further comprising the plurality of speakers.

4. The electronic device of claim 1, wherein the electronic device is a display device and the electronic mechanism is a display mechanism.

5. The electronic device of claim 1, wherein the electronic device is a projector and the electronic mechanism is a projection mechanism.

6. The electronic device of claim 3, wherein the plurality of speakers are intended for at least one of transportation and protection upon storage in the cavities of the housing.

7. The electronic device of claim 3, wherein the plurality of speakers are intended for use upon removal from the cavities of the housing.

8. The electronic device of claim 3, wherein the plurality of speakers are for a surround-sound speaker system.

9. The electronic device of claim 3, wherein the plurality of speakers are one of wired and wireless speakers.

10. An electronic device comprising:
a housing having one or more externally exposed cavities for removable and stackable storage of a plurality of speakers that are substantially flat in shape; and,
one or more covers to close the one or more cavities, such that the speakers are unexposed after storage of the speakers in the cavities and the covers have closed the cavities,
wherein the speakers are substantially flat in shape and stackably stored.

11. The electronic device of claim 10, further comprising one or more low-frequency speakers fixably mounted within the housing, such that the covers acoustically seal the cavities to function as acoustical cavities for the low-frequency speakers.

12. The electronic device of claim 10, further comprising the plurality of speakers.

13. The electronic device of claim 10, further comprising an electronic mechanism fixably situated within the enclosure.

14. The electronic device of claim 12, wherein the speakers are substantially flat in shape and have foldable stands hinged thereto.

15. The electronic device of claim 13, wherein the electronic device is a display device and the electronic mechanism is a display mechanism.

16. The electronic device of claim 13, wherein the electronic device is a projector and the electronic mechanism is a projection mechanism.

17. An electronic device comprising:
an enclosure;
a plurality of speakers that are substantially flat in shape; and,
means for removably and stackably storing the speakers within the enclosure such that the speakers are unexposed during storage.

18. The electronic device of claim 17, further comprising an electronic mechanism fixably situated within the enclosure.

19. The electronic device of claim 18, wherein the electronic device is a display device and the electronic mechanism is a display mechanism.

20. The electronic device of claim 18, wherein the electronic device is a projector and the electronic mechanism is a projection mechanism.

21. A method comprising:
storing a plurality of speakers within one or more cavities of a housing in which an electronic mechanism is fixably situated, such that the plurality of speakers cannot be used while stored within the cavities and are unexposed while stored within the cavities;
removing the speakers from the cavities of the housing; and,
utilizing the speakers after removal from the cavities of the housing.

22. The method of claim 21, further comprising transporting the housing while the speakers are stored within the cavities, the speakers protected within the cavities while the housing is transported.

23. The method of claim 21, further comprising:
opening one or more covers for the one or more cavities prior to storing the speakers within the cavities; and,
closing the covers for the cavities after storing the speakers within the cavities.

24. The method of claim 21, further comprising:
closing one or more covers for the one or more cavities after removal of the speakers from the cavities to acoustically seal the cavities to function as acoustical cavities for one or more low-frequency speakers fixably mounted within the housing; and,
utilizing the low-frequency speakers after closing the covers.

25. A method comprising:
providing a housing having one or more cavities for removably storing a plurality of speakers, such that the speakers are completely removable and non-electrically disconnectable from the housing;
fixably situating an electronic mechanism within the housing; and,
providing one or more covers corresponding to the one or more cavities of the housing, such that the speakers are unexposed after storage of the speakers in the cavities and the covers have closed the cavities.

26. The method of claim 25, further comprising fixably situating one or more low-frequency speakers within the housing, such that the covers acoustically seal the cavities to function as acoustical cavities for the low-frequency speakers.

27. The method of claim 25, further comprising providing the plurality of speakers.

28. The method of claim 25, wherein fixably situating the electronic mechanism within the housing comprises fixably situating a display mechanism within the housing.

29. The method of claim 28, wherein fixably situating the display mechanism within the housing comprises fixably situating a projection mechanism within the housing.

30. A projector comprising:
a housing;
a projection mechanism fixably situated in the housing; and,
one or more low-frequency speakers fixably mounted within the housing,
wherein the housing has one or more acoustical cavities for the low-frequency speakers.

31. The projector of claim 30, further comprising one or more covers corresponding to the one or more acoustical cavities, such that the covers close the cavities to acoustically seal the acoustical cavities.

32. The projector of claim 31, further comprising one or more additional speakers, wherein the one or more acoustical cavities are for removably storing the one or more additional speakers, such that the additional speakers are unexposed after storage of the additional speakers in the acoustical cavities and the covers have closed the acoustical cavities.

33. The projector of claim 32, wherein the additional speakers are intended for use upon removal from the acoustical cavities, and cannot be used while stored in the acoustical cavities.

34. The projector of claim 32, wherein the additional speakers are for a surround-sound speaker system.

35. The projector of claim 32, wherein the additional speakers are one of wired and wireless speakers.

* * * * *